(12) United States Patent
Watanabe et al.

(10) Patent No.: US 7,386,367 B2
(45) Date of Patent: Jun. 10, 2008

(54) WORKPIECE CONVEYING APPARATUS

(75) Inventors: Atsushi Watanabe, Tokyo (JP);
Kazunori Ban, Yamanashi (JP); Ichiro Kanno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 723 days.

(21) Appl. No.: 10/780,757

(22) Filed: Feb. 19, 2004

(65) Prior Publication Data
US 2004/0162639 A1    Aug. 19, 2004

(30) Foreign Application Priority Data
Feb. 19, 2003  (JP) .............................. 2003-041420

(51) Int. Cl.
*G05B 15/00*  (2006.01)
(52) U.S. Cl. ...................... 700/259; 700/245; 700/258; 901/2; 901/7
(58) Field of Classification Search ................ 700/245, 700/258, 259; 901/2, 7; 318/568.11, 568.16
See application file for complete search history.

(56) References Cited

U.S. PATENT DOCUMENTS

| | | | |
|---|---|---|---|
| 4,402,053 A * | 8/1983 | Kelley et al. ................ | 700/259 |
| 5,727,132 A | 3/1998 | Arimatsu et al. | |
| 6,278,906 B1 * | 8/2001 | Piepmeier et al. .......... | 700/250 |
| 6,597,971 B2 * | 7/2003 | Kanno ........................ | 700/245 |

FOREIGN PATENT DOCUMENTS

| | | |
|---|---|---|
| JP | 03-239487 | 10/1991 |
| JP | 5-304488 | 11/1993 |
| JP | 8-63214 | 8/1996 |
| JP | 9-34552 | 2/1997 |
| JP | 2000-71190 | 3/2000 |

OTHER PUBLICATIONS

EP Search Report for corresponding EP Application No. EP 04 25 0854 mailed Jun. 11, 2004.
Notice of Reasons for Rejection (Office Action) in corresponding JP Application No. 2003-041420 dated Dec. 20, 2005.
Notice of Reasons for Rejection issued in corresponding Japanese Patent Application No. 2006-41420, mailed on Oct. 2, 2007.

\* cited by examiner

*Primary Examiner*—Khoi H. Tran
*Assistant Examiner*—Marie A Weiskopf
(74) *Attorney, Agent, or Firm*—Staas & Halsey LLP

(57) ABSTRACT

A workpiece is gripped by a robot hand and an image of the workpiece is captured by a camera. An image processing device detects the position and posture of a characteristic portion of the workpiece. On the basis of the present position of the robot, the relative position and posture between a flange of the robot and the workpiece characteristic portion is detected. The relative position and posture is compared with that observed when the workpiece is gripped correctly, to determine a gripping error. If the gripping error exceeds a permissible error, the robot is stopped. If the gripping error is equal to or less than the permissible error, a taught position where the workpiece is to be released is corrected so as to cancel the adverse effect of the gripping error.

4 Claims, 4 Drawing Sheets

WORKPIECE CONVEYING APPARATUS

BACKGROUND OF THE INVENTION

1. Field of the Invention

The present invention relates to a conveying apparatus that uses a hand of a robot for gripping and conveying a workpiece.

2. Description of the Related Art

For a system gripping a workpiece with a robot hand and conveying it to the next process, it is very important to check whether the workpiece is accurately gripped or not. If the hand of the robot has a gripping error, it is necessary to give corresponding redundancy to the system for the next process. In some cases, expansion of the system, such as addition of space or peripheral equipments, is required. For these reasons, attempts have hitherto been made to use a visual sensor to check the state where a workpiece is gripped. In this case, generally, the movement of the robot is interrupted at a position where a characteristic portion of the workpiece is within the visual field of a camera so as to allow the camera to capture an image at a definite time, and then an image is captured by the camera and the gripped state is measured.

Furthermore, a visual sensor is used for measuring the position of a workpiece without stopping a conveying apparatus. This system is called a visual tracking system. With this system, the visual sensor detects a workpiece placed on a belt conveyor acting as a conveying apparatus, the position of the robot is corrected on the basis of the positional deviation of the workpiece on the conveyor, and then the workpiece is taken out by the robot. An example of this visual tracking system is disclosed in Japanese Patent Application Laid-Open No. 8-63214.

If the robot is stopped to observe the gripped state, tact time increases correspondingly, in some cases, to a level unacceptable to users. Furthermore, visual tracking will allow only small-sized workpieces to be processed owing to condition of conveyor size. For example, for large-sized workpieces such as floor panels of automobiles, it is unpractical to incorporate a tracking system using a conveyor, in view of the cost of and the space for the exclusive conveyor.

SUMMARY OF THE INVENTION

The present invention solves the problems of the above described prior art by using a visual sensor to detect a characteristic position of a workpiece gripped by a hand of a robot and using the results of the detection to determine how the workpiece is gripped (or the gripped state of the workpiece).

Specifically, the present invention is applicable to a workpiece conveying apparatus comprising a robot which conveys a workpiece gripped by the hand of the robot, and a visual sensor. The visual sensor comprises image pick-up means for capturing an image of a characteristic portion of the workpiece that is being conveyed by the robot and position detecting means for detecting the position of the characteristic portion of the workpiece observed at the time of the imaging, on the basis of an image of the characteristic portion obtained by the image pick-up means. Then, on the basis of the positions of the robot and of the characteristic portion of the workpiece observed at the time of the imaging, the gripped state of the workpiece is recognized while the workpiece is being conveyed by the robot.

The workpiece conveying apparatus can include means for pre-storing a predetermined gripped state established by the hand of the robot, means for comparing the predetermined gripped state with the gripped state recognized by the visual sensor at the time of the imaging to determine an error, and means for stopping the robot when the error exceeds a predetermined tolerance limit or means for outputting a signal indicative of a fault.

Alternatively, the workpiece conveying apparatus can include means for pre-storing a predetermined gripped state established by the hand of the robot, means for comparing the predetermined gripped state with the gripped state recognized by the visual sensor to determine an error, and means for correcting a position to which the robot conveys the workpiece, on the basis of the error.

The gripped state is typically provided by a relative position and posture between an arm tip or the hand of the robot and the workpiece. The means for detecting the position of the robot at the time of the imaging can be provided in a robot controller. The controller can further include means for synchronizing an imaging instruction given to the image pick-up means with the detection of the position of the robot by the detecting means at the time of the imaging. In this case, it is allowable to repeatedly execute, a number of times, the imaging instruction synchronized with the detection of the position of the robot at the time of the imaging.

In a workpiece conveying apparatus according to the present invention, it is possible to observe how a workpiece is gripped by a hand of robot without stopping the robot, allowing a flexible and inexpensive system to be constructed without affecting the tact time and without the need to provide an exclusive conveyor even for large-sized workpieces.

BRIEF DESCRIPTION OF THE DRAWINGS

The above and other objects and features of the present invention will be apparent from the following description of an embodiment taken in conjunction with the attaching drawings in which.

DESCRIPTION OF THE EMBODIMENT

Figure 1:
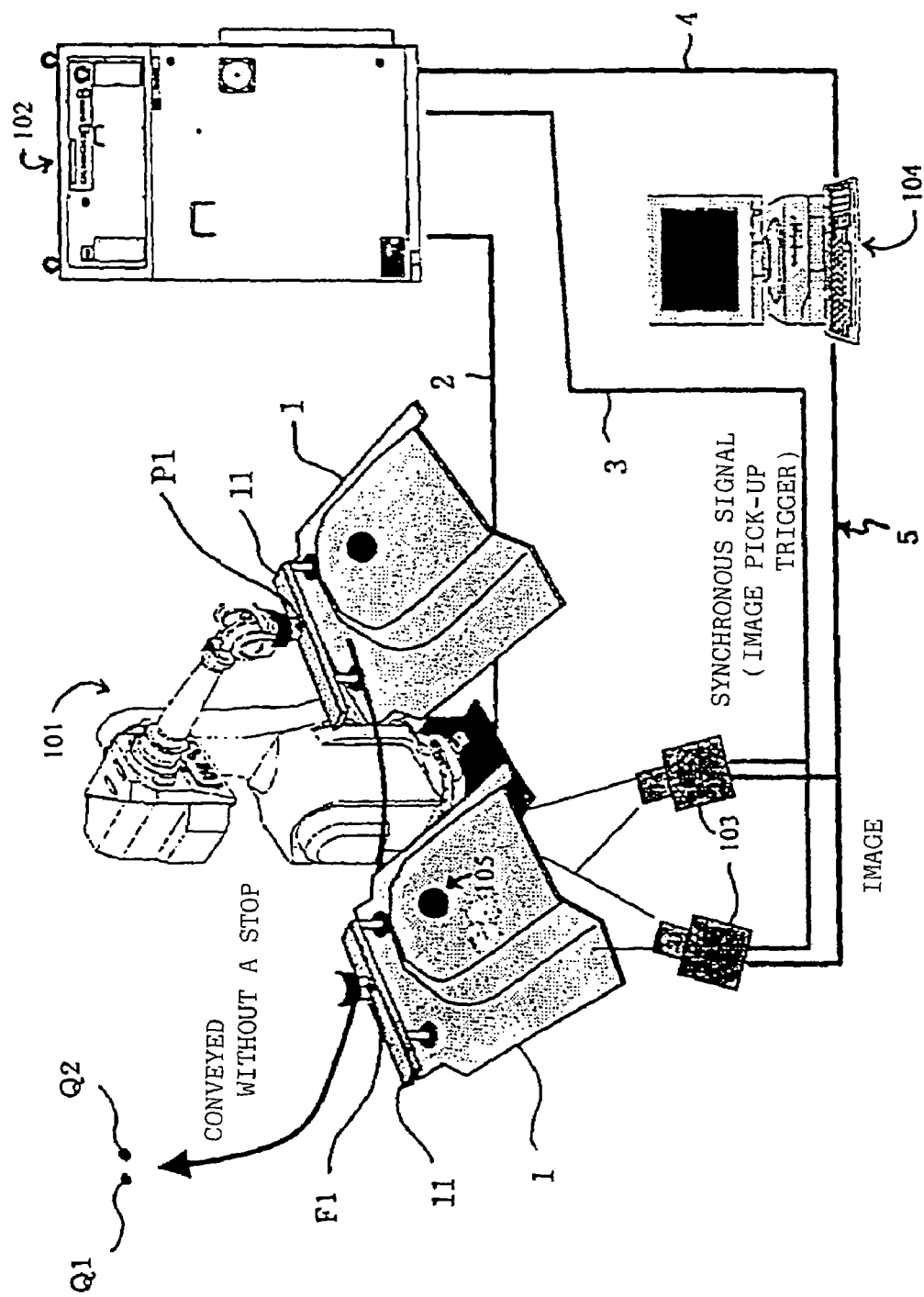
FIG. 1 is a view illustrating the entire arrangement of an embodiment of a workpiece conveying apparatus according to the present invention.

FIG. 1 is a view illustrating the entire arrangement of an embodiment of the present invention. As shown in this figure, a workpiece conveying apparatus according to the present embodiment is composed of a robot (mechanism section) 101 that uses a hand 11 installed at an arm tip (a flange as a mechanical interface) to grip and convey a workpiece 1, a robot controller 102 that controls the robot 101 and the hand 11, two video cameras 103 constituting image pick-up means for a three-dimensional visual sensor, and a personal computer (image processing device) 104 that processes an image signal obtained by the video cameras 103.

The robot controller 102 is connected to the robot 101 via a cable 2. The cable 2 includes a signal line through which signals controlling the hand 11 are sent, a feeding line through which driving power is transmitted, and the like. The robot controller 102 is further connected to the personal computer 104 via a LAN network 4 and to the cameras 103 via a trigger signal line 3. The internal configuration and common functions of the robot controller 102, its connection to a teach pendant (not shown), and the like are well known, and their specific description is omitted.

The camera 103 is connected to the image processing device 104 via a video cable 5. The workpiece 1 is a large-sized part (for example, a panel for an automobile) and is gripped at a robot position P1 by the hand 11. The hand 11 is selected in accordance with design, i.e. the shape and weight of the workpiece 1 and the like. A system for the hand is not specifically limited; the hand may utilize suction, a chuck, or the like. In this case, the hand 11 is illustrated to use two suckers to suck and grip the workpiece 1.

As shown by an arrow in the figure, the robot 101 moves through positions P1 and F1 and then releases the workpiece 1 at a predetermined position (pre-taught position) Q1 to deliver it to the next process. However, as described later, the workpiece 1 is released at a position obtained by correcting the taught position Q1 depending on how each conveyed workpiece is gripped. The robot 101 moves along a locus from the position P1 through the position F1 to the position Q1 without a stop.

Furthermore, sensing (image capturing, in the case of the present embodiment) is carried out at the robot position F1 to recognize the gripped state of the workpiece 1. As described later, this position is recognized by the robot control apparatus 102 as the present position of the robot 101 observed when the two cameras capture an image of the gripped workpiece 1. It should be noted that the robot 101 need not be stopped at the position F1.

In this embodiment, the visual sensor is a three-dimensional visual sensor of a stereo system using two image pick-up means. However, another type of three-dimensional visual sensor may be used. For example, it is possible to use a three-dimensional visual sensor into which a projector for projecting pattern light such as slit light or spot light and a light detector (a video camera, PSD, or the like) for detecting a reflection of the pattern light are incorporated. Alternatively, a two-dimensional sensor using a single camera may be used if no problems occur with information obtained only from within a plane.

It is assumed that calibrations for correct measurements, connection to a coordinate system set in the robot, and the like have already been completed. As the details of the configuration and common functions of these three-dimensional sensors, calibrations, connection to the coordinate system, and the like are well known, their description is omitted here.

For the workpiece 1 to be conveyed, a characteristic portion 105 common to all workpieces is pre-selected. The characteristic portion 105 is selected from the suitable characteristic portions (for example, a small hole, a projection, a light-dark pattern, or a color mark) for which a position on the workpiece 1 is preset and the position and posture of which can be detected by image processing by the personal computer 104.

Image capturing by means of the two image pick-up means (or, typically, sensing by means of a sensor head of the visual sensor) is carried out in a manner such that the characteristic portion 105 of the workpiece 1 being gripped and conveyed is ensured to be within a visual field. The personal computer 104 detects the position and posture of the characteristic portion 105 in an obtained image and determines the gripped state of the workpiece 1, on the basis of the data on the position and posture of the characteristic portion 105 and the robot position F1 observed at the time of the image capturing. Specifically, the gripped state of the workpiece 1 is grasped to be the relative positional relationship between the "detected position and posture of the characteristic portion 105" and a "hand coordinate system or a coordinate system fixed on the hand" or a "flange coordinate system or a coordinate system fixed on the flange (mechanical interface) of the robot". In this case, the position and posture of the robot 101 is represented by the position and posture of the origin of the flange coordinate system. Consequently, the position P1 indicates the position and posture of the origin of the flange coordinate system observed when the "workpiece is gripped". The position F1 indicates the position and posture of the origin of the flange coordinate system observed when an "image is captured". The position Q1 indicates the position and posture of the origin of the flange coordinate system observed when the "workpiece is released" (before corrections based on the gripped state).

Figure 2:
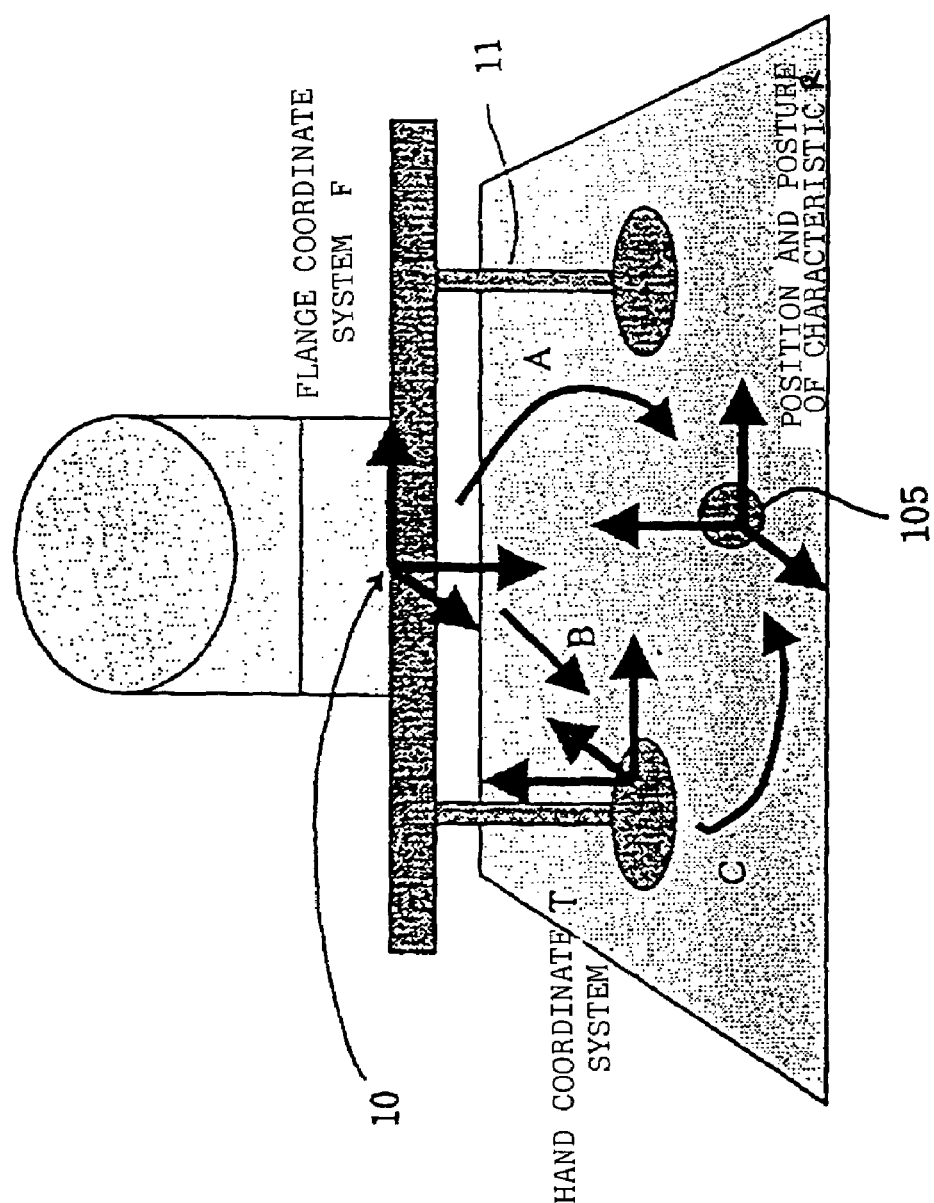
FIG. 2 is a view illustrating the relative positional relationship between an arm tip (flange) and a hand of a robot and a characteristic portion.

The above explanation is illustrated in FIG. 2. In this figure, reference symbol F denotes a flange coordinate system fixed on the flange (mechanical interface) 10 of the robot 101. Reference symbol T denotes a hand coordinate system fixed on the hand 11. The position and posture of the characteristic portion 105 detected by imaging/image processing is defined by R. Then, the workpiece gripped state can be determined either by the relative relationship A between the position and posture R and the flange coordinate system F, or by the relative relationship C between the position and posture R and the hand coordinate system T, provided that it is assumed that the relative relationship B between the hand coordinate system T set on the hand 11 and the flange coordinate system F is known. In this case, F, T, R, A, B, and C can be expressed by 4×4 homogeneous transformation matrix, as is well known.

With such a matrix, the relative relationship A between the position and posture R of the characteristic portion 105, which indicates a detection result, and the flange coordinate system F is determined by the following relation (1):

$$A = Inv(F) * R \qquad (1)$$

where Inv is a symbol meaning an inverse matrix.

Likewise, the relative relationship C between the position and posture R of the characteristic portion 105, which indicates a detection result, and the hand coordinate system T is determined by the following relation (2):

$$C = Inv(F*B) * R \qquad (2)$$

In Equations (1) and (2), F can be recognized by the robot controller 102 as the robot position F1 observed when an image is captured to obtain the detection result R. Accordingly, the relative relationship A can be determined using Equation (1). Furthermore, as described above, if the relative relationship B between the flange coordinate system F and the hand coordinate system T is known, the relative relationship C can be determined using Equation (2). The result is equivalent whichever relative relationship is focused in recognizing the workpiece gripped state.

Figure 3:
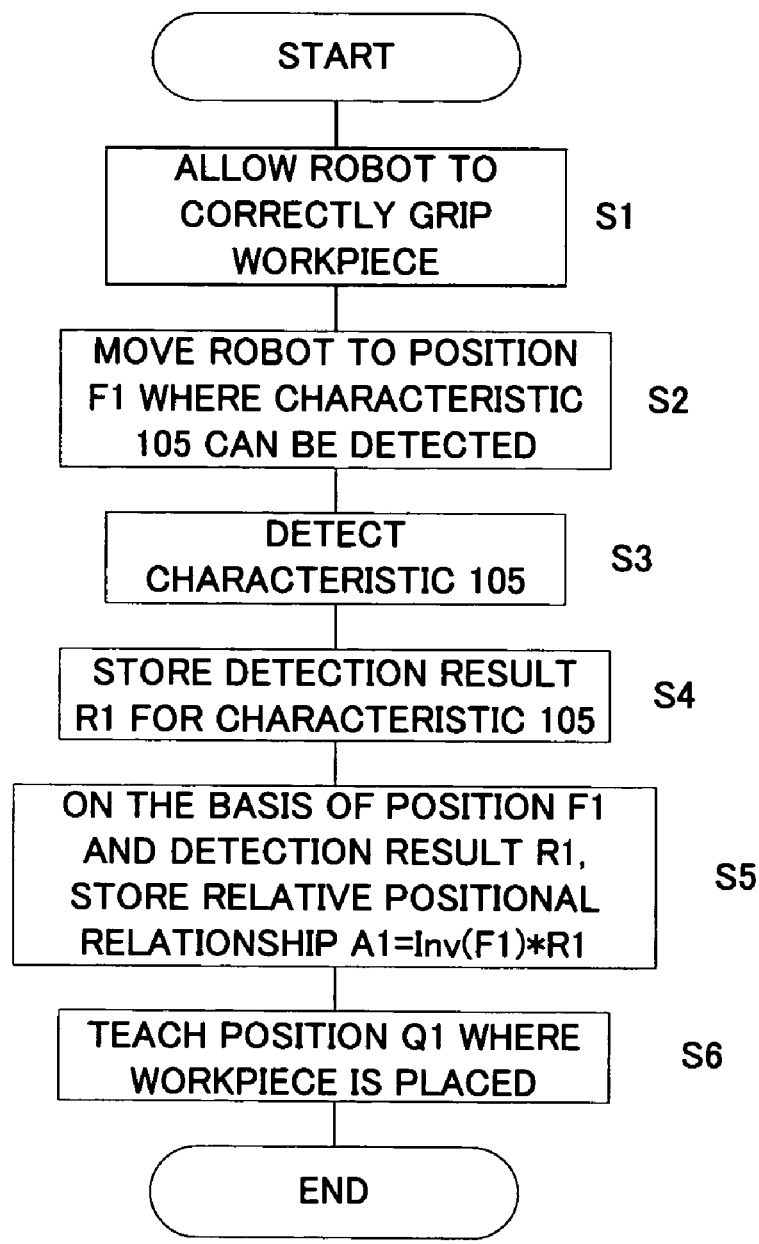
FIG. 3 is a flow chart schematically showing a preprocess executed by an embodiment of the workpiece conveying apparatus according to the present invention.

In the present embodiment, the gripped state grasped by the relative relationship A or C is determined to be normal or abnormal. Furthermore, the position Q1 where the gripped workpiece is released (placed) is corrected in accordance with the gripped state (gripped position and posture). To achieve this, a normal gripped state and the workpiece released position Q1 are taught in advance to the system (workpiece conveying apparatus) as references. A preprocess executed in the pre-teaching is schematically shown in the flow chart in FIG. 3. The main point in each step will be described below.

Step S1: The hand 11 of the robot 101 is caused to grip the workpiece 1 correctly with manual operation. The robot position where the workpiece 1 is gripped may be set anywhere. The gripping operation may be performed at the position P1 taught by an operation program or at any another robot position.

Step S2: The robot 101 is caused to move (using jog feeding, for example) to the position F1 suitable for the detection (image pick-up by the camera 103) of the characteristic portion 105 of the gripped workpiece. During this preprocess, the robot 101 is caused to stop at the position F1. The position F1 is stored in a memory in the robot controller 102.

Step S3: The robot controller 102 transmits an image pick-up trigger instruction to each of the cameras 103 to detect (capture image of) the characteristic portion 105 of the gripped workpiece 1. On the other hand, the robot controller 102 transmits an image taking-in instruction to the personal computer 104. The obtained images are thus transmitted to the personal computer 104.

Step S4: Image processing is carried out within the personal computer 104 to determine the position and posture of the characteristic portion 105. The position and posture obtained is defined as R1.

Step S5: The position F1 and the obtained position and posture R1 are substituted into the value F and the value R in Equation (1), described above. Thus, A1=Inv (F1)*R1 is determined and stored in the memory in the robot controller 102. Alternatively, these values may be substituted into the value F and the value R in Equation (2), described above, to obtain and store C1=Inv(F1*B)*R1.

Step S6: The robot 101 gripping the workpiece 1 is caused to move (using jog feeding, for example) to a workpiece release position for the next process. The appropriate workpiece release position Q1 is taught to finish the preprocess. Here, "appropriate" workpiece release position Q1 means that a workpiece release position Q1 is appropriate in the state where the workpiece is gripped in the preprocess. As described later, the workpiece release position Q1 is corrected in accordance with the last workpiece gripped state (see reference symbol Q2 in FIG. 1).

After the above preparations, an actual gripping and conveying operations are performed. After gripping the workpiece 1, the robot 101 passes through the visual field of the camera 103 without a stop. The cameras 103 are caused to capture images of the characteristic portion 105 on the basis of any one of the two following timings:

(1) When the characteristic portion 105 enters the visual field (for example, a specified time has passed since the start of movement of the robot) as expected by the robot device 102, an image pick-up triggers is transmitted to the cameras 103.

(2) Immediately after or after a specified time has elapsed from the start of movement of the robot, the robot controller 102 starts periodically delivering image pick-up triggers to allow the cameras 103 to periodically capture images.

Figure 4:
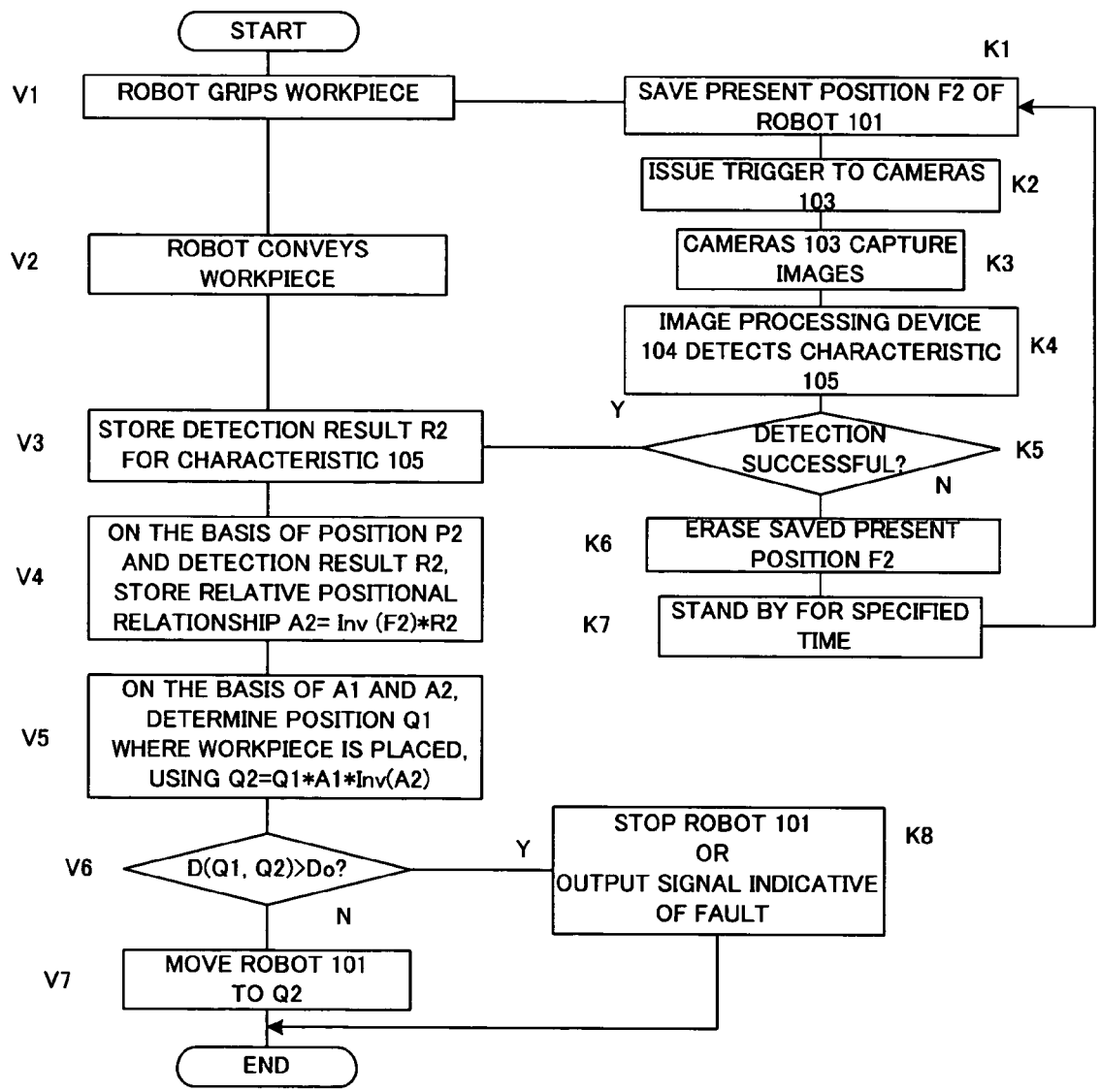
FIG. 4 is a flow chart schematically showing a workpiece conveying process executed by an embodiment of the workpiece conveying apparatus according to the present invention.

Either method may be employed but in the following description, the method (2) is assumed to be employed. The flow chart in FIG. 4 schematically shows a process executed during an operation. The main point in each step will be described below.

Step V1: The hand 11 of the robot 101 grips the workpiece 1 at the gripping position P1.

Step V2: Immediately after the gripping, the robot 101 starts moving along a pre-taught path.

Steps K1/K2/K3: On the other hand, immediately after the gripping, the robot 101 saves the present position and synchronously transmits image pick-up triggers to the cameras 103. Then the cameras 103 immediately capture images. The present position will be denoted as F2 below.

Step K4: The robot controller 102 transmits an image taking-in instruction to the personal computer 104. The personal computer 104 takes in the images and attempts to detect the characteristic portion 105. Alternatively, the personal computer 104 may constantly take in (the latest) images at short intervals, instead of transmitting the image taking-in instruction from the robot controller 102 to the personal computer 104.

Step K5: If the characteristic portion 105 is successfully detected, the process proceeds to step V3. If failed to be detected, on the other hand, the process proceeds to step K6.

Step K6: The data on the robot position F2 stored at step K1 is erased.

Step K7: The process stands by for a specified time (for example, a time equivalent to the movement of the robot by 5 cm) and then process returns to step K1. As a matter of course, before the characteristic portion 105 is positioned within the visual fields of both cameras 103, the cycle of step K5→step K6→step K7→step K1→ . . . step K5→step K6→step K7→step K1 . . . is repeated.

Step V3: The detection result (position and posture) R2 for the characteristic portion 105 obtained at step K4 is transferred from the personal computer 104 to the robot controller 102. The detection result R2 is then stored in the memory in the robot controller 102.

Step V4: A2=Inv (F2)*R2 is determined on the basis of Equation (1) described above, using the data on the robot position F2 stored at step k1 and the detection result R2, and the result is stored in the memory in the robot controller 102. Alternatively, C2=Inv (F2*B)*R2 may be determined on the basis of Equation (2), and the result is stored.

Step V5: The amount of corrections required for the position Q1 where the workpiece is placed is obtained using Equation (3) below on the basis of A1 and A2.

$$Q2=Q1*A1*Inv(A2) \quad (3)$$

Step V6: The positions Q1 and Q2 are compared with each other to check whether their difference index D (Q1, Q2) exceeds a tolerance limit D0. If exceeding, the process proceeds to step K8. If not exceeding, on the other hand, the process proceeds to step V7. In this connection, various difference indices D are possible. For example, neglecting the posture, D is considered to be the distance between Q1 and Q2, and D0 is considered to be a permissible maximum distance. Alternatively, setting maximum permissible values Wth, Pth, and Rth of the differences of the posture (W, P, R), it may be determined that the gripped state is normal as far as the criteria for both distance and posture are met.

Step K8: The robot is caused to stop, assuming that the gripping operation has failed. Alternatively, a fault signal indicative of the failure is issued.

Step V7: The robot 101 is caused to move to the position Q2 (corrected position of Q1) to release the workpiece 1.

Thus, the process is completed to convey one piece of workpiece. Subsequently, the process returns to step V1 as required to grip the next workpiece. Then, a similar process is repeated.

According to the present invention, as described above, the workpiece gripped state established by the hand can be observed without stopping the robot. This prevents the tact time from being affected. Furthermore, a flexible and inexpensive system can be constructed which need not use any exclusive conveyors even for large-sized workpieces.

The invention claimed is:

1. A workpiece conveying apparatus comprising:
a robot having a hand to grip a workpiece and conveying the workpiece; and
a visual sensor, comprising:
   a robot controller which detects the position of the robot;
   image pick-up means for capturing an image of a characteristic portion of the workpiece while the workpiece is being moved by said robot to a release position; and
   position detecting means for detecting, on the basis of the image of the characteristic portion obtained by said image pick-up means, a position of the characteristic portion of the workpiece observed when the image is captured,
   said robot controller including means for synchronizing an image pick-up instruction given to said image pick-up means with said detection of the position of the robot at the time of image capture,
   said visual sensor recognizing the gripped state of said workpiece while the workpiece is being moved by the robot to the release position, on the basis of the positions of the robot and the characteristic portion of the workpiece when the image is captured;
   means for storing in advance a predetermined gripped state established by the hand of said robot;
   means for comparing the predetermined gripped state with the gripped state recognized by said visual sensor when the image is captured, and determining an error; and
   means for stopping the robot when the error exceeds a predetermined tolerance limit or for issuing a signal indicative of a fault.

2. A workpiece conveying apparatus comprising:
a robot having a hand to grip a workpiece and conveying the workpiece; and
a visual sensor, comprising:
   a robot controller which detects the position of the robot;
   image pick-up means for capturing an image of a characteristic portion of the workpiece while the workpiece is being moved by said robot to a release position; and
   position detecting means for detecting, on the basis of the image of the characteristic portion obtained by said image pick-up means, a position of the characteristic portion of the workpiece observed when the image is captured,
   said robot controller including means for synchronizing an image pick-up instruction given to said image pick-up means with said detection of the position of the robot at the time of image capture,
   said visual sensor recognizing the gripped state of said workpiece while the workpiece is being moved by the robot to the release position, on the basis of the positions of the robot and the characteristic portion of the workpiece when the image is captured;
   means for storing in advance a predetermined gripped state established by the hand of said robot;
   means for comparing the predetermined gripped state with the gripped state recognized by said visual sensor to determine an error; and
   means for correcting the release position to which said robot conveys the workpiece, on the basis of the error.

3. The workpiece conveying apparatus according to any one of claims 1 and 2, wherein said gripped state is provided by a relative position and posture between an arm tip or said hand of said robot and said workpiece.

4. The workpiece conveying apparatus according to any one of claims 1 and 2, wherein the imaging instruction synchronized with the detection of the position of the robot when the image is captured is repeatedly executed a number of times.

* * * * *